United States Patent [19]

Aagano

[11] Patent Number: 4,816,676

[45] Date of Patent: Mar. 28, 1989

[54] RADIATION IMAGE RECORDING AND READ-OUT APPARATUS INCLUDING RADIATION STOP AND SCAN AREA CONTROL MEANS

[75] Inventor: Toshitaka Aagano, Kanagawa, Japan

[73] Assignee: Fuji Photo Film Co., Ltd., Kanagawa, Japan

[21] Appl. No.: 661,755

[22] Filed: Oct. 17, 1984

[30] Foreign Application Priority Data

Oct. 21, 1983 [JP] Japan ................. 58-197193

[51] Int. Cl.⁴ ............................................. G01T 1/105
[52] U.S. Cl. ............................... 250/327.2; 250/484.1
[58] Field of Search ............... 250/327.2, 485.1, 484.1; 378/175; 358/287

[56] References Cited

U.S. PATENT DOCUMENTS

| | | | |
|---|---|---|---|
| 4,236,078 | 11/1980 | Kotera et al. | 250/363 R |
| 4,239,968 | 12/1980 | Kotera et al. | 250/327.2 |
| 4,258,264 | 3/1981 | Kotera et al. | 250/484.1 |
| 4,276,473 | 6/1981 | Kato et al. | 250/327.2 |
| 4,284,889 | 8/1981 | Kato et al. | 250/354.1 |
| 4,315,318 | 2/1982 | Kato et al. | 364/515 |
| 4,387,428 | 6/1983 | Ishida et al. | 364/414 |
| 4,392,239 | 7/1983 | Wilkens | 378/146 |
| 4,400,619 | 8/1983 | Kotera et al. | 250/327.2 |
| 4,506,302 | 3/1985 | Kurata | 358/285 |

FOREIGN PATENT DOCUMENTS

| | | | |
|---|---|---|---|
| 77678 | 4/1983 | European Pat. Off. | 250/327.2 |
| 83719 | 7/1983 | European Pat. Off. | 250/327.2 |

Primary Examiner—Janice A. Howell
Assistant Examiner—Constantine Hannaher
Attorney, Agent, or Firm—Sughrue, Mion, Zinn, Macpeak & Seas

[57] ABSTRACT

A radiation image recording and read-out apparatus comprises an image recording section for recording a radiation image of an object on a stimulable phosphor sheet, a read-out section for scanning the stimulable phosphor sheet by stimulating rays and for detecting the light emitted thereby upon stimulation, and an erasing section for releasing the radiation energy remaining on the stimulable phosphor sheet. The stimulable phosphor sheets are circulated through these sections and reused for image recording. A radiation stop device is positioned at the image recording section for defining the radiation exposure area on the stimulable phosphor sheet. Information on the radiation exposure area is stored in a storage device for each stimulable phosphor sheet. On the basis of this information, the area of scanning by the stimulating rays in the read-out section is controlled so that the scanning is conducted approximately over the radiation exposure area.

11 Claims, 2 Drawing Sheets

RADIATION IMAGE RECORDING AND READ-OUT APPARATUS INCLUDING RADIATION STOP AND SCAN AREA CONTROL MEANS

BACKGROUND OF THE INVENTION

1. Field of the Invention

This invention relates to a radiation image recording and read-out apparatus for exposing a stimulable phosphor to a radiation to have a radiation image stored therein, scanning the stimulable phosphor by stimulating rays to cause the stimulable phosphor carrying the radiation image stored therein to emit light in proportion to the radiation energy stored, detecting the emitted light and converting it into an electric signal, and reproducing a visible image by use of the obtained electric signal. This invention particularly relates to a radiation image recording and readout apparatus in which sheets comprising the stimulable phosphor are circulated and reused for recording radiation images, and image read-out is conducted efficiently in accordance with the image recording areas in the stimulable phosphor sheets.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned by stimulating rays which cause it to emit light in proportion to the radiation energy stored. The light emitted by the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examination, it is disadvantageous to load a mobile X-ray diagnostic station with a number of stimulable phosphor sheets, and the amount of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

In order to reuse stimulable phosphor sheets as described above, the radiation energy remaining on the stimulable phosphor sheet after it is scanned by stimulating rays to read out the radiation image stored therein should be eliminated or erased by the method as described, for example, in U.S. Pat. No. 4,400,619 or Japanese Unexamined Patent Publication No. 56(1981)-12599. The stimulable phosphor sheet can then be used again for radiation image recording.

Accordingly, it is desired that there be combined into a single apparatus: an image recording section for exposing each circulatable and reusable sheet comprising a stimulable phosphor to a radiation passing through an object, an image read-out section for reading out the radiation image stored in the stimulable phosphor sheet, and an erasing section for erasing the radiation energy remaining on the stimulable phosphor sheet after the read-out step for the purpose of again recording another radiation image thereon. This is because such an arrangement would make it possible to easily load the apparatus on the mobile X-ray diagnostic station to conduct medical examinations at different locations. Such an apparatus could also be easily installed in a hospital or the like. This is very advantageous in practical use.

However, when stimulable phosphor sheets are circulated and reused as described above, the size of the used stimulable phosphor sheets is limited. Therefore, a small radiation image of, for example, the palm of the hand or the diseased region may have to be recorded on a stimulable phosphor sheet of a large size adapted for recording a radiation image of, for example, the frontal chest. When a small radiation image is recorded on a unnecessarily large stimulable phosphor sheet, since the image read-out operation is conducted also for a wide marginal portion outside of the necessary image portion which should be reproduced for viewing purposes, the image read-out time becomes unnecessarily long. Further, in the case where a radiation image of a small diseased region is recorded on the stimulable phosphor sheet, there arise not only the problem that the image read-out time becomes unnecessarily long as described above but also the problem that the tissues of the human body outside the diseased region are unnecessarily exposed to radiation. Since the radiation may harm the human body, this problem must be eliminated from the viewpoint of safety. For this purpose, it becomes necessary to conduct a troublesome operation such as application of lead plates to the portions of the human body of which a radiation image is not required to be recorded in the stimulable phosphor sheet.

The problems mentioned above can be solved by preparing the circulatable and reusable stimulable phosphor sheets in various sizes and selecting the sheet size in accordance with the area of the portion for which the radiation image is to be recorded. However, in this case, it is necessary to select the sheet size and feed the stimulable phosphor sheet of the selected size each time image recording is conducted, and the image recording operation becomes complicated.

SUMMARY OF THE INVENTION

The primary object of the present invention is to provide a radiation image recording and read-out apparatus in which stimulable phosphor sheets for recording radiation images thereon are circulated and reused, and in which image recording is conducted at high speeds.

Another object of the present invention is to provide a radiation image recording and read-out apparatus which is small and suitable for installation and conveyance even in a mobile X-ray diagnostic station for mass medical examinations.

The specific object of the present invention is to provide a radiation image recording and read-out apparatus which eliminates unnecessary exposure to radiation and prevents the image read-out time from becoming unnecessarily long without necessitating complicated operations for image recording.

The radiation image recording and read-out apparatus in accordance with the present invention comprises:

(i) a circulating and conveying means for conveying at least one stimulable phosphor sheet for recording a radiation image thereon along a predetermined circulation path, (ii) an image recording section positioned on said circulation path for recording a radiation image of an object on said stimulable phosphor sheet by exposing said stimulable phosphor sheet to a radiation passing through said object, (iii) a radiation stop means for defining the radiation exposure area of said stimulable phosphor sheet in said image recording section, (iv) an exposure area information storage means for storing the radiation exposure area information for each stimulable phosphor sheet, (v) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted by said stimulable phosphor sheet scanned by said stimulating rays to obtain an electric image signal, (vi) a stimulating ray scanning area control means for controlling the scanning area of said stimulating rays so that the scanning by said stimulating rays is conducted approximately over the radiation exposure area in said image read-out section on the basis of the exposure area information stored in said exposure area information storage means, and (vii) an erasing section positioned on said circulation path for, prior to the next image recording on said stimulable phosphor sheet for which the image read-out has been conducted in said image read-out section, releasing the radiation energy remaining on said stimulable phosphor sheet.

In the present invention, since the stimulable phosphor sheets are circulated through the image recording section, the image read-out section and the erasing section, it is possible to reuse the stimulable phosphor sheets and to realize an apparatus which is small in size. The radiation image recording and read-out apparatus is suitable particularly for the case where many radiation images must be recorded continuously as in mass medical examinations. The technical effects of the present invention are very advantageous in practical use. Further, since the radiation stop means is provided and the stimulating ray scanning area is controlled in accordance with the radiation exposure area on each stimulable phosphor sheet at the step of image read-out, it is possible to limit image read-out only to the required portion of the stimulable phosphor sheet. Therefore, the image read-out time does not become unnecessarily long, and the processing capacity of the apparatus is improved.

In the present invention, the electric image signal obtained in the image read-out section may be once stored in a recording medium such as a magnetic tape or a magnetic disk, displayed on a CRT or the like to immediately observe the radiation image, or permanently recorded as a hard copy on a photographic material or the like by use of a reproducing apparatus. The reproducing apparatus may be directly coupled with the radiation image recording and read-out apparatus in accordance with the present invention, installed separately from the radiation image recording and read-out apparatus for conducting reproduction via a memory, or placed at a remote position for carrying out reproduction through radio communication. In the last mentioned case, it is possible, for example, to reproduce the radiation image recorded in the mobile X-ray diagnostic station by use of a radio signal receiver in a hospital, and through radio communication to inform the mobile X-ray diagnostic station of the results of diagnosis conducted by a radiologist at the hospital.

The "stimulable phosphor" referred to in this invention means a phosphor which is able to store radiation energy therein upon exposure to a radiation such as X-rays, $\alpha$-rays, $\beta$-rays, $\gamma Y$-rays or ultraviolet rays and then emit light in proportion to the stored energy of the radiation upon stimulation by stimulating rays such as visible light.

By "stimulable phosphor sheet" is meant a sheet-like recording material comprising the aforesaid stimulable phosphor. In general, the stimulable phosphor sheet is composed of a substrate and a stimulable phosphor layer overlaid on the substrate. The stimulable phosphor layer comprises an appropriate binder and the stimulable phosphor dispersed therein. When the stimulable phosphor layer is self-supporting, the stimulable phosphor layer can by itself form the stimulable phosphor sheet.

In the present invention, in order to improve the signal-to-noise ratio, it is preferable that the stimulable phosphor emit light having a wavelength range not overlapping the range of wavelength of the stimulating rays employed to excite the stimulable phosphor. Preferably, when a laser source which emits stimulating rays having a wavelength within the range between 450 nm and 900 nm is used, a stimulable phosphor which emits light having a wavelength within the range between 300 nm and 500 nm should be selected.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}, M^{II}x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaQ.xAl_2O_3:Eu$ wherein $0.8 \leq x \leq 10$; and $M^{II}O.xSiO_2:A$ wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in U.S. Pat. No 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in European Patent Publication No. 21,342, or barium fluorohalide phosphors added with at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in European Patent Publication No. 21,174.

The radiation image recording and read-out apparatus in accordance with the present invention is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the stimulable phosphor varies over a very wide range in proportion to the amount of energy stored therein, it is possible to obtain an image having desirable density regardless of the amount of exposure of the stimulable phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image system using a stimulable phosphor sheet, compensation for deviation of the level of the radiation energy stored in the stimulable phosphor sheet from a desired level can easily be carried out by adjusting the read-out gain to an appropriate value when photoelectrically reading out the light emitted from the stimulable phosphor sheet upon stimulation thereof. Therefore, the quality of the reproduced radiation image is not adversely affected by a fluctuation in radiation dose due to fluctuating tube voltage or the MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired. Particularly, when the radiation image is used for medical diagnosis, it is possible to obtain a radiation image processed in the manner most suitable for a particular portion of the human body such as the heart, the chest or the like, thereby realizing an improvement in diagnostic efficiency and accuracy.

However, in order to eliminate various influences caused by the fluctuation of radiographic exposure conditions and/or to obtain a radiation image having a high image quality or a high diagnostic efficiency and accuracy, it is necessary to investigate such image input conditions of the radiation image stored in the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to adjust the read-out gain appropriately or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in U.S. Pat. No. 4,284,889, which is based on the finding that the amount of light instantaneously emitted from the stimulable phosphor sheet upon exposure thereof to a radiation is proportional to the amount of the radiation energy stored in the stimulable phosphor sheet. In this method, image input information is investigated by detecting the instantaneously emitted light, and appropriate signal processing is carried out on the basis of the image input information in order to obtain a visible radiation image having an improved image quality, particularly a high diagnostic efficiency and accuracy. In this method, since it is possible to adjust the read-out gain to an appropriate value, to select an appropriate scale factor, or to conduct an appropriate mode of signal processing, a radiation image suitable for viewing, particularly for diagnostic purpose, can be obtained regardless of fluctuation of the radiographic exposure conditions. However, since the recording of a radiation image on the stimulable phosphor sheet and readout of the recorded image from the stimulable phosphor sheet are usually carried out at different locations, a signal transfer system must be installed therebetween, necessitating a complicated and expensive apparatus.

Thus it is desired to simply and accurately detect the image input information of a radiation image stored in a stimulable phosphor sheet prior to a read-out operation for obtaining a visible image for viewing, particularly for diagnostic purposes, and to reproduce a radiation image having an improved image quality, particularly a high diagnostic efficiency and accuracy, on the basis of the detected image input information.

The aforesaid need can be satisfied by conducting in advance a read-out operation for detecting the image input information of a radiation image stored in a stimulable phosphor sheet (hereinafter referred to as the preliminary read-out) by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter carrying out the final read-out. In the final read-out, the read-out gain is adjusted, and/or the image processing conditions are determined appropriately on the basis of the image input information obtained by the preliminary read-out.

In the present invention, the radiation image recording and read-out apparatus should preferably be provided with a means for conducting the preliminary read-out as described above, and a control means for adjusting the read-out conditions in the final read-out and/or the image processing conditions on the basis of the image input information obtained by the preliminary read-out.

The term "stimulation energy" as used herein means the effective energy of the stimulating rays which the stimulable phosphor sheet receives per unit area.

In the present invention, the stimulation energy of the stimulating rays applied to the stimulable phosphor sheet in the preliminary read-out should be of a level lower than the level of the stimulation energy of the stimulating rays used in the final read-out. As the ratio of the stimulation energy of the stimulating rays in the preliminary read-out to the stimulation energy of the stimulating rays in the final read-out approaches one, the amount of radiation energy remaining on the stimulable phosphor sheet after the preliminary read-out decreases. It has been found that, when the aforesaid ratio is smaller than one, it is possible to obtain a radiation image suitable for viewing, particularly for diagnostic purposes, by adjusting the read-out gain to an appropriate value. However, in order to obtain a radiation image having an improved image quality, particularly a high diagnostic efficiency and accuracy, the aforesaid ratio should preferably be as small as possible insofar as the image input information of the radiation image stored in the stimulable phosphor sheet can be detected sufficiently to permit determination of the read-out conditions or the image processing conditions, that is, insofar as the light emitted from the stimulable phosphor sheet in the preliminary read-out can be detected sufficiently for the above-mentioned purposes. Thus, the aforesaid stimulation energy ratio should generally be within the range of 50% or less, preferably within the range of 10% or less, more preferably within the range of 3% or less. The lower limit of this ratio is determined according to the accuracy of the system for detecting the light emitted from the stimulable phosphor sheet in the preliminary read-out.

In the present invention, the stimulating ray source and the photoelectric read-out means for the preliminary readout should preferably be used in common also for the final read-out as described below. In this case, in order to make the level of stimulation energy of the stimulating rays in the preliminary read-out lower than the level of the stimulation energy of the stimulating rays in the final read-out, it is possible to use any known method. For example, in the preliminary read-out, the output level of the laser beam source may be decreased, the beam diameter of the laser beam may be increased, the scanning speed of the laser beam may be increased, or the moving speed of the stimulable phosphor sheet may be increased.

In the above-described aspect of the present invention, since the image input conditions of a radiation image stored in the stimulable phosphor sheet can be investigated in advance, it is possible to obtain a radiation image having an improved image quality, particularly a high diagnostic efficiency and accuracy, regardless of fluctuation in the radiographic exposure conditions, by adjusting the read-out gain on the basis of the detected image input information and without using a read-out system having a wide dynamic range. Further, since the image input pattern of the radiation image stored in the stimulable phosphor sheet can be investigated in advance, it is possible to obtain a radiation image having an improved image quality, particularly a high diagnostic efficiency and accuracy, by processing the read-out electric signal in the manner most suitable for the image input pattern, and/or by optimizing the scale factor. It is also possible to reduce the read-out time by omitting the final read-out for any portion of the stimulable phosphor sheet found to be carrying no image in the preliminary read-out.

In another aspect of the present invention, the stimulating ray source and the photoelectric read-out means for the preliminary read-out are used also for the final readout, an adjusting means for making the level of the stimulation energy of the stimulating rays in the preliminary read-out lower than the level of the stimulating rays in the final read-out is provided, and the preliminary read-out and the final read-out are conducted by twice moving the stimulable phosphor sheet over the same section. In this aspect, it becomes possible to realize an apparatus of small size even when the preliminary read-out is carried out therein, in addition to the final read-out. In order to conduct the preliminary read-out and the final read-out by twice moving the stimulable phosphor sheet over the same section, the sheet may be returned once after the sheet is moved first over the section so that the sheet is moved twice in the same direction over the same section. Or, the preliminary read-out may be carried out when the sheet is moved forward, and the final read-out may be carried out when the sheet is moved backward.

DESCRIPTION OF THE PREFERRED EMBODIMENTS

The present invention will hereinbelow be described in further detail with reference to the accompanying drawings.

Figure 1:
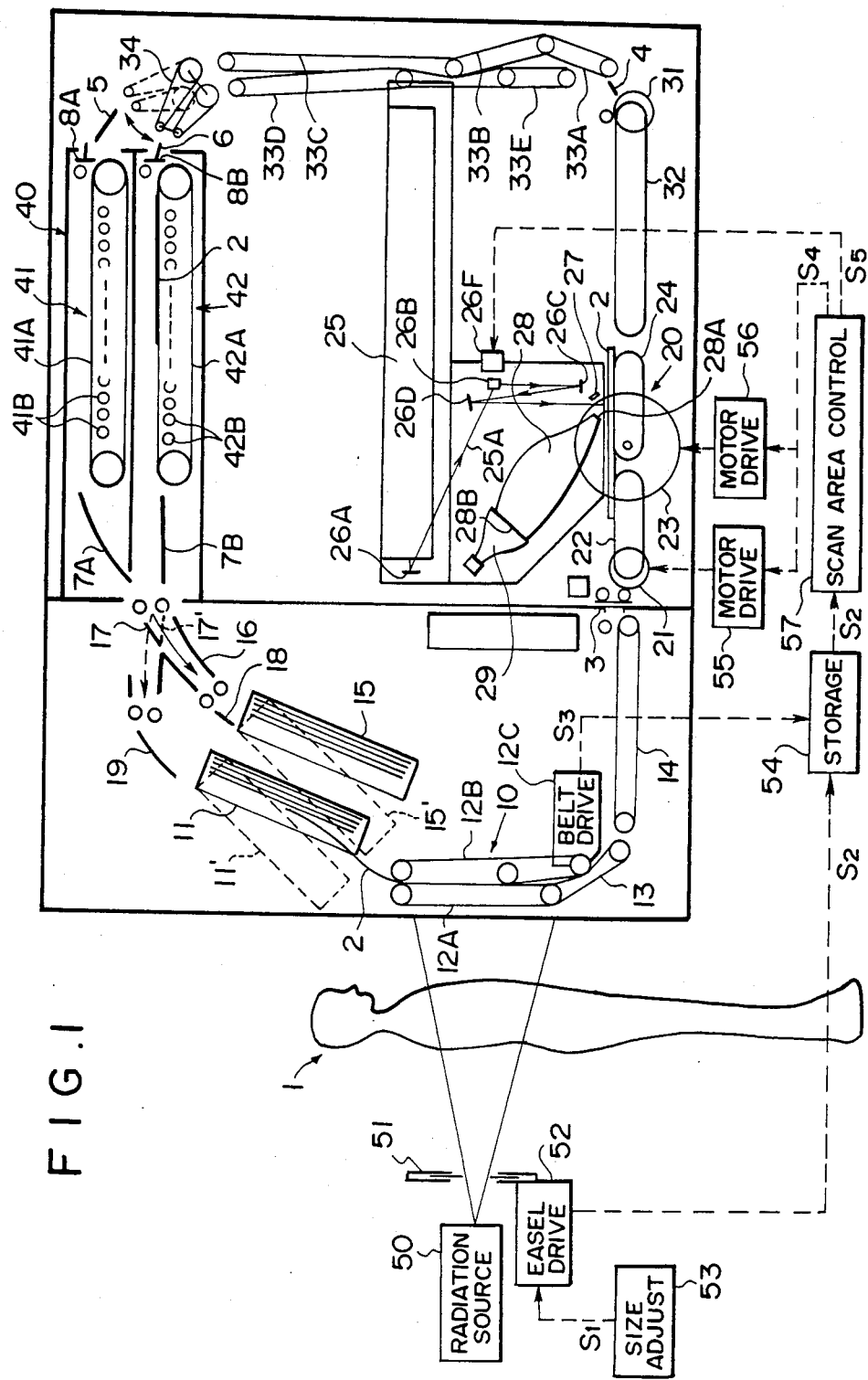
FIG. 1 is a schematic view showing an embodiment of the radiation image recording and read-out apparatus in accordance with the present invention.

FIG. 1 shows an embodiment of the radiation image recording and read-out apparatus in accordance with the present invention, wherein a radiation image of, e.g., the frontal chest of an object in a standing position is recorded on a stimulable phosphor sheet. An image recording section 10 is positioned at the same height as that of the frontal chest of an object 1. To the image recording section 10 are fed stimulable phosphor sheets 2 one by one from a sheet case 11 or 15 in the sheet feed position. The image recording section 10 comprises a pair of endless belts 12A and 12B for holding the sheet 2 therebetween, and an auxiliary endless belt 13 positioned under the endless belts 12A and 12B for receiving the sheet 2 from the endless belts 12A and 12B and guiding it to a conveyer belt 14. The conveyer belt 14 receives the sheet 2 from the image recording section 10 and conveys it to an image read-out section 20.

A radiation source 50 for emitting a radiation such as X-rays to the sheet 2 is positioned to stand face to face with the sheet 2 held between the endless belts 12A and 12B. The radiation emitted by the radiation source 50 passes through the object 1 positioned between the radiation source 50 and the sheet 2, and a radiation image of the object 1 is stored in the sheet 2. An easel 51 acting as the radiation stop means is positioned between the radiation source 50 and the object 1. The easel 51 is driven by a drive section 52 which is controlled by a size adjusting signal S1 output by a size adjusting circuit 53 operated, for example, by a size adjusting switch positioned on an operation console. The drive section 52 outputs an exposure area signal S2 representing the degree of opening of the easel 51, i.e. the radiation exposure area on the sheet 2. The exposure area signal S2 is stored in an exposure area information storage means 54 described later. To the storage means 54 is also input a sheet feed signal S3 by a drive unit 12C for the endless belt 12B.

In the image read-out section 20, a first feed belt 22 driven by a motor 21 and a second feed belt 24 driven by a motor 23 are positioned in series to feed the sheet 2 at a predetermined speed in the sub-scanning direction. Between the image recording section 10 and the image read-out section 20 is positioned an openable shutter 3 for preventing any disturbing light from entering the image read-out section 20 from the image recording section 10 when the radiation image stored in the sheet 2 is read out in the image read-out section 20. In the image readout section 20, a laser beam source 25 is positioned above the first feed belt 22 and the second feed belt 24. There are also positioned a mirror 26A, a galvanometer mirror 26B, a mirror 26C and a mirror 26D for scanning the sheet 2 on the belts 22 and 24 with a laser beam 25A emitted from the laser beam source 25. As the galvanometer mirror 26B is swung, the sheet 2 is scanned with the laser beam 25A in the main scanning direction. At the scanning position of the laser beam 25A on the sheet 2 is positioned a light guiding reflection mirror 27 along the main scanning line. Thus light emitted from the sheet 2 upon stimulation thereof by the laser beam 25A, including the light emitted therefrom and reflected by the light guiding reflection mirror 27, enters a light guiding optical element 28 from a light input face 28A thereof. The light is guided inside of the light guiding optical element 28 through total reflection up to a light output face 28B of the light guiding optical element 28, and received by a photomultiplier 29 in close contact with the light output face 28B. In this manner, the light emitted from the sheet 2 in proportion to the radiation energy stored therein is detected and converted into an electric image signal by the photomultiplier 29. The electric image signal thus obtained is sent to an image processing circuit (not shown) and subjected therein to required image processing. The electric image signal thus processed is then sent to an image reproducing apparatus (not shown). As described above, the image reproducing apparatus may be a display device such as a CRT, or may be a photographic reproducing apparatus for reproducing a visible image in a photographic film by point-by-point scanning, or may be a memory device using e.g. a magnetic tape for memorizing the electric image signal for later use in image reproduction.

The motors 21 and 23 are respectively controlled by motor drive control circuits 55 and 56 to which a sub-scanning width signal S4 generated by a stimulating ray scanning area control circuit 57 is input. A main scanning width signal S5 generated by the stimulating ray scanning area control circuit 57 is input to a drive circuit 26F for the galvanometer mirror 26B. To the stimulating ray scanning area control circuit 57 is input the exposure area signal S2 generated by the storage means 54.

In the image read-out section 20, the scanning widths of the stimulating rays are changed in accordance with the radiation exposure area on the sheet 2 as described below. When the object 1 is positioned between the radiation source 50 and the stimulable phosphor sheet 2 held between the endless belts 12A and 12B and the radiation source 50 is activated to emit a radiation, an image of the radiation passing through the object 1 is stored in the sheet 2. At this time, the aforesaid size adjusting switch (not shown) is operated, and the easel drive section 52 is driven by the size adjusting signal S1 generated by the size adjusting circuit 53, thereby adjusting the easel 51 to a desired degree of opening. The degree of opening of the easel 51 is adjusted stepwise so that the radiation exposure area on the sheet 2 becomes equal to, for example, 356 mm×432 mm, 356 mm×356 mm, 254 mm×305 mm, or 203 mm×254 mm. Therefore, the degree of opening of the easel 51 can be selected in accordance with the size of the image recording portion of the object 1.

When the degree of opening of the easel 51 has been adjusted, the easel drive section 52 generates the exposure area signal S2 representing the degree of opening of the easel 51, i.e. the radiation exposure area on the sheet 2. The exposure area signal S2 is input to and stored in the storage means 54. When the endless belts 12A and 12B are rotated to feed the sheet 2 to the image read-out section 20 after a radiation image is stored therein, the sheet feed signal S3 is generated by the drive unit 12C and sent to the storage means 54. Upon receiving the sheet feed signal S3, the storage means 54 sends the exposure area signal S2 stored in advance to the stimulating ray scanning area control circuit 57. In this embodiment, the sheet 2 is directly fed from the image recording section 10 to the image read-out section 20 without temporarily accumulating a number of such sheets 2 therebetween. Therefore, when the sheet feed signal S3 is input to the storage means 54 and the exposure area signal S2 is output thereby, the exposure area signal S2 input to the stimulating ray scanning area control circuit 57 always corresponds to the sheet 2 which was exposed to the radiation over the area represented by the exposure area signal S2 and which is subjected next to image read-out in the image readout section 20.

On the basis of the exposure area signal S2, the stimulating ray scanning area control circuit 57 generates the sub-scanning width signal S4 and the main scanning width signal S5. The main scanning width signal S5 is sent to the galvanometer mirror drive circuit 26F which changes the swing angle of the galvanometer mirror 26B in accordance with the signal S5 so as to conduct scanning in the main scanning direction over a scanning width approximately equal to the length of the radiation exposure portion of the sheet 2 in the main scanning direction. The sub-scanning width signal S4 is sent to the motor drive control circuits 55 and 56 which control the rotation amounts of the sub-scanning motors 21 and 23 in accordance with the signal S4 and move the sheet 2 in the sub-scanning direction over a length approximately equal to the length of the radiation exposure portion of the sheet 2 in the sub-scanning direction. Accordingly, scanning by the stimulating rays is carried out approximately over the radiation exposure area of the sheet 2, and is not unnecessarily conducted for the marginal portion where no radiation image is stored.

Figure 2:
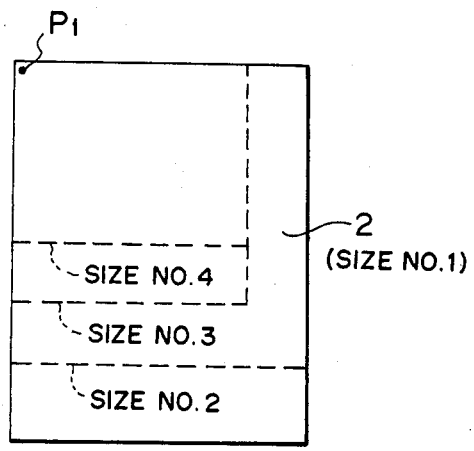
FIGS. 2 and 3 are schematic views showing examples of adjustment of the radiation image recording size.
Figure 3:
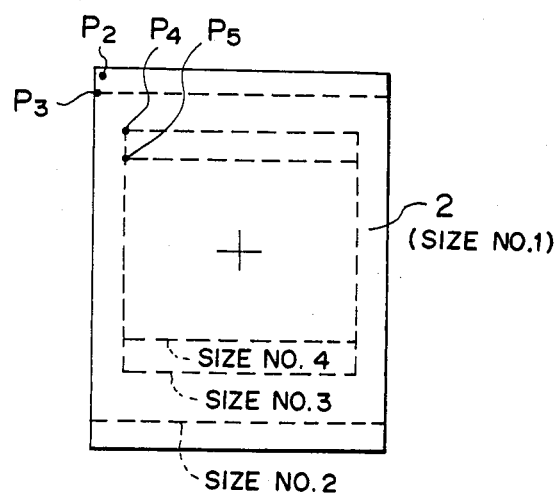

The easel 51 should preferably be operated so that, as shown in FIG. 2, the radiation exposure portions of all sizes on the sheets 2 align with each other at two sides. In this case, it is possible to always adjust a scanning start point P1 near the corner at which the two sides meet regardless of the sizes of the radiation exposure portions. In the case where the easel 51 is operated such that, as shown in FIG. 3, the centers of the radiation exposure portions of all sizes on the sheets 2 align with each other, it is necessary to change the scanning start point to P2, P3, P4 and P5 in accordance with the sizes of the radiation exposure portions. For this purpose, the operations of the galvanometer mirror 26B and motors 21 and 23 must be controlled in a complicated manner.

In the aforesaid embodiment, the size of the radiation exposure portion on the sheet 2 can be changed stepwise. However, it is also possible to adjust the size of the radiation exposure portion infinitely. In the case where the sheets 2 are temporarily accumulated between the image recording section 10 and the image read-out section 20, it is possible to store the radiation exposure area information for the respective sheets 2 by combining the drive unit 12C with a sheet feed counter or the like. Further, though the exposure area signal S2 is output by the drive section 52 for the easel 51 in the aforesaid embodiment, it is also possible to generate the exposure area signal S2 and the size adjusting signal S1 by the size adjusting circuit 53 and to input them in parallel into the storage means 54 and the drive section 52. It is also possible to apply a frame plate made of lead or the like as the radiation stop means to the image recording portion of the object 1, and to operate a size input button or the like in accordance with the size of the frame plate, thereby sending the exposure area signal S2 to the storage means 54.

On the downstream side of the image read-out section 20 is positioned a feed belt 32 driven by a motor 31. Above the feed belt 32 on he downstream side thereof are vertically positioned endless belts 33A, 33B, 33C, 33D and 33E for holding and conveying the sheet 2. Further, above the group of endless belts 33A through 33E (i.e. on the downstream side thereof) is positioned a pair of belts 34 which are made pivotable so that the sheet conveying direction can be changed to distribute the sheets 2 in two directions. Between the downstream end portion of the feed belt 32 and the lower end portion of the group of belts 33A through 33E is positioned a guide plate 4 for guiding the sheet 2 from the former to the latter.

In front of the pair of belts 34 (i.e. on the downstream side thereof) is positioned an erasing section 40 comprising a pair of erasing units 41 and 42 installed one above the other. A guide plate 5 is positioned between the inlet of the erasing unit 41 and the pair of belts 34, and a guide plate 6 is positioned between the inlet of the erasing unit 42 and the pair of belts 34. The erasing unit 41 comprises a transparent endless belt 41A and a plurality of fluorescent lamps 41B positioned inside of the endless belt 1A, and the erasing unit 42 comprises a transparent endless belt 42A and a plurality of fluorescent lamps 42B positioned inside of the endless belt 42A. In the erasing section 40, since a long time is required for erasing, the sheet feed speed must, in an apparatus having a small size, be lower than that on the upstream side of the erasing section 40 in order that erasing can be carried out over a long time. Therefore, in the erasing section 40, the endless belts 41A and 42A are used alternately and the feed speeds thereof are adjusted to values far lower than the sheet feed speed on the upstream side of the erasing section 40, so that a long erasing time can be obtained with short endless belts. At the outlet of the erasing units 41 and 42 are positioned a guide plate 16 and a distribution plate 17 movable between two positions indicated with solid line (17) and broken line (17') for distributing the sheets 2 conveyed out of the erasing units 41 and 42 via guide plates 7A and 7B to the sheet cases 11 and 15. Thus, the sheets 2 conveyed out of the erasing units 41 and 42 are alternately forwarded to the sheet cases 11 and 15.

In FIG. 1, the distribution plate 17 is in the position for guiding the sheets 2 into the lower sheet case 15, the lower sheet case 15 is in the position for receiving the sheets 2, and the upper sheet case 11 is in the position feeding the sheets 2 to the image recording section 10. The sheet cases 11 and 15 alternately repeat sheet receiving and sheet feeding. More specifically, when all of the sheets 2 housed in the upper sheet case 11 have been fed one by one to the image recording section 10, the sheet case 11 is moved up to the sheet receiving position indicated by a chain line 11'. Thereafter, the sheet case 15 containing the sheets 2 in the sheet receiving position is moved up to the sheet feed position indicated by a chain line 15', and the sheets 2 are fed one by one from the sheet case 15 to the image recording section 10. Thus the sheet cases 11 and 15 are installed for movement between the sheet receiving position and the sheet feed position. When the sheets 2 are fed from either one of the sheet cases 11 and 15, the other is in the position receiving the sheets 2. Thus, when one of the sheet cases 11 and 15 is used for sheet feeding and runs out of the sheets 2, then the positions of the sheet cases 11 and 15 are changed and the sheets 2 are fed from the other sheet case in which the sheets 2 have been accumulated.

Between the inlet portions of the erasing units 41 and 42 and the pair of belts 34 are positioned shutters 8A and 8B for preventing the erasing light from leaking out of the erasing units 41 and 42.

In the embodiment described above, the sheet 2 in which a radiation image is stored in the image recording section 10 is passed through the image read-out section 20, belts 33A through 33E, and the erasing section 40, and then returned to and temporarily housed in the sheet case 11 or 15. When a predetermined number of sheets 2 have been accumulated in the sheet case 11 or 15, the sheet case 11 or 15 is moved to the sheet feed position, and the sheets 2 are again fed one by one to the image recording section 10 and reused for image recording.

In the above-described embodiment, the sheet cases 11 and 15 are positioned between the image recording section 10 and the erasing section 40. However, the sheet cases 11 and 15 may be installed in any other positions, for example, in front of or at the rear of the image read-out section 20. Further, the sheet cases 11 and 15 may not be installed at all in the apparatus. For instance, in the embodiment shown in FIG. 1, the sheet cases 11 and 15 may simply be removed and a conveyor belt may be substituted therefor.

In the present invention, since a sheet 2 once used for image recording and read-out is automatically conveyed to the image recording section 10 and is reused for further image recording, it is possible to use the sheet 2 repeatedly. Further, the apparatus is small in size and it is possible to increase the image recording speed. Also, since the components of the apparatus are combined into a single apparatus, the apparatus is easy to convey and to install in a mobile X-ray diagnostic station.

The apparatus as shown in FIG. 1 can be modified in various ways. For example, when the aforesaid preliminary read-out and the final read-out are carried out in the image read-out section 20, it is possible to conduct the preliminary read-out by rotating the belts 22 and 24 and feeding the sheet 2 in the sub-scanning direction, then reversely rotate the belts 22 and 24 to return the sheet 2, and again feed the sheet 2 forward to conduct the final read-out. It is also possible to carry out the final read-out when the sheet 2 is returned by reversely rotating the belts 22 and 24, and then to feed the sheet 2 forward to the next feed belt.

In the aforesaid embodiment, when the sheet 2 is introduced into the erasing section 40, image read-out should preferably not be conducted so that no noise is generated in the read-out image signal by strong light emitted by the fluorescent lamps 41B and 42B and entering the image read-out section 20. Also, at this time, the power source for the photomultiplier 29 in the image read-out section 20 should preferably be turned off so that no overcurrent will flow through the photomultiplier 29.

I claim:

1. A radiation image recording and read-out apparatus comprising:
   (i) a circulating and conveying means for conveying at least one stimulable phosphor sheet for recording a radiation image thereon along a predetermined circulation path,
   (ii) an image recording section positioned on said circulation path for recording a radiation image of an object on said stimulable phosphor sheet by exposing said stimulable phosphor sheet to a radiation passing through said object,
   (iii) a radiation stop means for defining the radiation exposure area of said stimulable phosphor sheet in said image recording section,
   (iv) an exposure area information storage means for storing the radiation exposure area information for each stimulable phosphor sheet,
   (v) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted by said stimulable phosphor sheet scanned by said stimulating rays to obtain an electric image signal,
   (vi) a stimulating ray scanning area control means for controlling the scanning area of said stimulating rays so that the scanning by said stimulating rays is conducted approximately over the radiation exposure area in said image read-out section on the basis of the exposure area information stored in said exposure area information storage means, and
   (vii) an erasing section positioned on said circulation path for, prior to the next image recording in said stimulable phosphor sheet for which the image read-out has been conducted in said image read-out section, releasing the radiation energy remaining in said stimulable phosphor sheet.

2. An apparatus as defined in claim 1 wherein said radiation stop means generates and sends said exposure area information to said exposure area information storage means, and said circulating and conveying means generates information on sheet feeding from said image recording section, and sends said information to said exposure area information storage means.

3. An apparatus as defined in claim 1 or 2 wherein said radiation stop means is operated so that radiation exposure portions of various sizes on the stimulable phosphor sheets align with each other at two sides.

4. An apparatus as defined in claim 3 wherein said stimulating ray scanning area control means controls the scanning area by sending a main scanning width signal to a means for scanning in the main scanning direction and by sending a sub-scanning width signal to a means for scanning in the sub-scanning direction.

5. An apparatus as defined in claim 4 wherein said circulating and conveying means is constructed so as to convey a plurality of stimulable phosphor sheets sequentially through said image recording section, said image read-out section and said erasing section and, at the same time, to stop one stimulable phosphor sheet at each of said image recording section and said image read-out section and at least one stimulable phosphor sheet at said erasing section.

6. An apparatus as defined in claim 3 wherein said circulating and conveying means is constructed so as to convey a plurality of stimulable phosphor sheets sequentially through said image recording section, said image read-out section and said erasing section and, at the same time, to stop one stimulable phosphor sheet at each of said image recording section and said image read-out section and at least one stimulable phosphor sheet at said erasing section.

7. An apparatus as defined in claim 1 or 2 wherein said stimulating ray scanning area control means controls the scanning area by sending a main scanning width signal to a means for scanning in the main scanning direction and by sending a sub-scanning width signal to a means for scanning in the sub-scanning direction.

8. An apparatus as defined in claim 7 wherein said circulating and conveying means is constructed so as to convey a plurality of stimulable phosphor sheets sequentially through said image recording section, said image read-out section and said erasing section and, at the same time, to stop one stimulable phosphor sheet at each of said image recording section and said image read-out section and at least one stimulable phosphor sheet at said erasing section.

9. An apparatus as defined in claim 1 or 2 wherein said circulating and conveying means is constructed so as to convey a plurality of stimulable phosphor sheets sequentially through said image recording section, said image read-out section and said erasing section and, at the same time, to stop one stimulable phosphor sheet at each of said image recording section and said image read-out section and at least one stimulable phosphor sheet at said erasing section.

10. An apparatus as defined in claim 1 wherein said image read-out section conducts both preliminary read-out and final read-out.

11. An apparatus as defined in claim 10 wherein said image read-out section conducts preliminary read-out and final read-out by use of a single stimulating ray source and a single photoelectric read-out means.

* * * * *